(12) United States Patent
Imamura

(10) Patent No.: US 8,767,068 B2
(45) Date of Patent: Jul. 1, 2014

(54) DISTANCE MEASURING APPARATUS BASED ON PARALLAX WITH CONDITIONS ON CURVATURE AND FOCUS LENGTH

(75) Inventor: Norihiro Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 454 days.

(21) Appl. No.: 12/812,668

(22) PCT Filed: Nov. 16, 2009

(86) PCT No.: PCT/JP2009/006119
§ 371 (c)(1),
(2), (4) Date: Jul. 13, 2010

(87) PCT Pub. No.: WO2010/055688
PCT Pub. Date: May 20, 2010

(65) Prior Publication Data
US 2010/0289895 A1  Nov. 18, 2010

(30) Foreign Application Priority Data

Nov. 17, 2008 (JP) ................................. 2008-293359

(51) Int. Cl.
*H04N 7/18* (2006.01)
(52) U.S. Cl.
USPC ........................................................ 348/135
(58) Field of Classification Search
CPC ....................................................... H04N 9/47
USPC ........................................................ 348/135
IPC ........................................................ H04N 9/47
See application file for complete search history.

(56) References Cited

U.S. PATENT DOCUMENTS

| 6,833,873 B1 | 12/2004 | Suda |
| 2003/0086013 A1 | 5/2003 | Aratani |
| 2009/0225215 A1 | 9/2009 | Korenaga et al. |

FOREIGN PATENT DOCUMENTS

| JP | 63-280207 | | 11/1988 |
| JP | 2000-286784 | | 10/2000 |
| JP | 2001-078217 | | 3/2001 |
| JP | 2002-098885 | | 4/2002 |
| JP | 2002098885 A | * | 4/2002 |
| JP | 2003-015029 | | 1/2003 |
| JP | 2003015029 A | * | 1/2003 |
| JP | 2003-143459 | | 5/2003 |

OTHER PUBLICATIONS

International Search Report for corresponding International Application No. PCT/JP2009/006119 mailed Jan. 19, 2010.

* cited by examiner

*Primary Examiner* — Jay Patel
*Assistant Examiner* — Francis G Geroleo
(74) *Attorney, Agent, or Firm* — Renner, Otto, Boisselle & Sklar, LLP

(57) ABSTRACT

A distance measuring apparatus includes: a number of simple lenses in substantially the same shape, on which light that has come from the object of range finding is incident; and an image capturing section, which has a number of image capturing areas and which captures the images of the object of range finding that have been produced by the respective simple lenses on their associated image capturing areas. The lens surfaces of each lens that are opposed to the object of range finding and the image capturing section, respectively, are only aspheric refracting surfaces. In each of the simple lenses, the paraxial radii of curvature R1 and R2 of the lens surfaces that are opposed to the object of range finding and the image capturing section, respectively, and its focus length f satisfy the condition $-2.4 \leq f(1/R1+1/R2) \leq -0.6$.

3 Claims, 13 Drawing Sheets

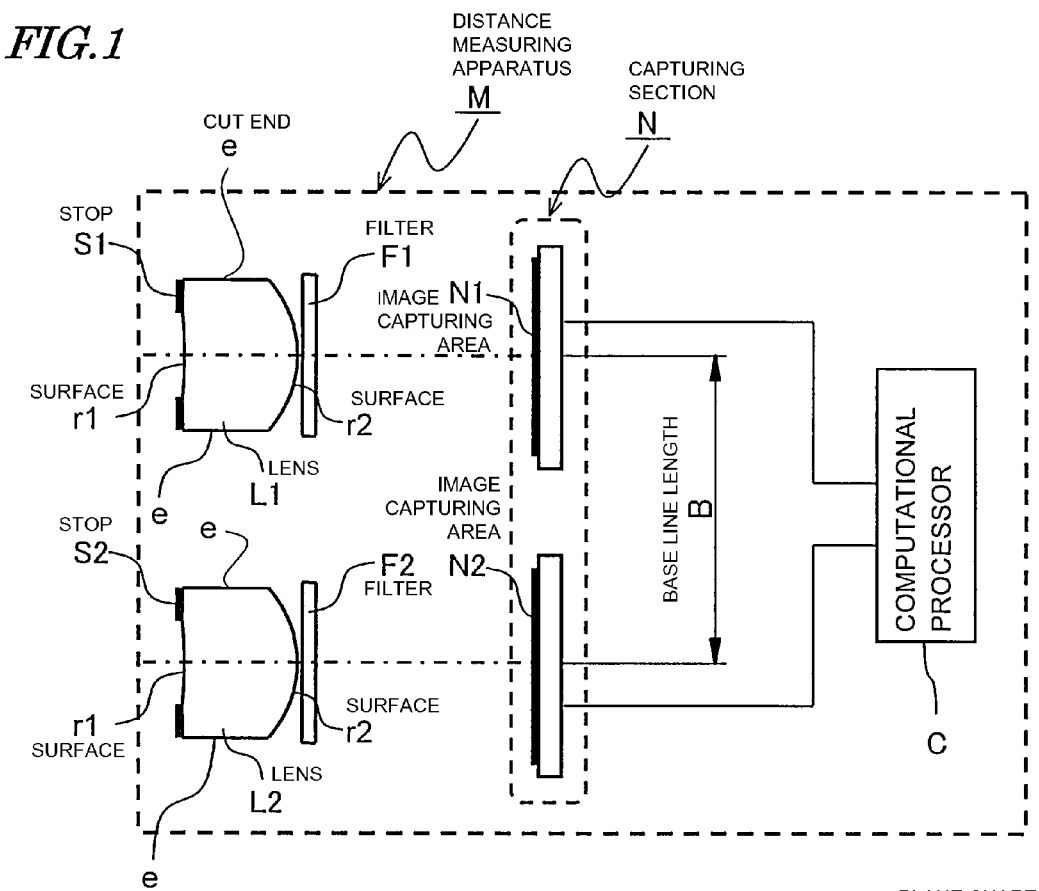
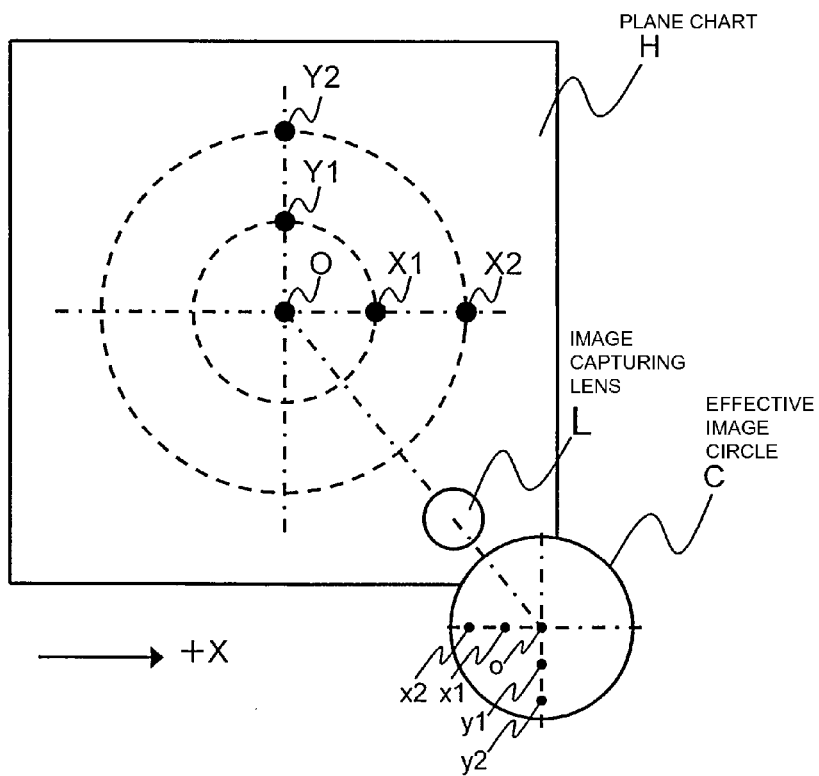

(a) SPHERICAL ABERRATION
(b) ASTIGMATISM
(c) DISTORTION (a) SPHERICAL ABERRATION
(b) ASTIGMATISM
(c) DISTORTION (a) SPHERICAL ABERRATION  (b) ASTIGMATISM  (c) DISTORTION (a) SPHERICAL ABERRATION   (b) ASTIGMATISM   (c) DISTORTION

DISTANCE MEASURING APPARATUS BASED ON PARALLAX WITH CONDITIONS ON CURVATURE AND FOCUS LENGTH

TECHNICAL FIELD

The present invention relates to a distance measuring apparatus for determining the distance to an object based on a parallax between multiple imaging optical systems.

BACKGROUND ART

Recently, a distance measuring apparatus has been used as a device for determining the distance to an object (i.e., the object of range finding) based on a parallax between multiple imaging optical systems. Specifically, such a device has been used to determine the distance between running cars and as a member of an autofocusing system for cameras or a three-dimensional shape measuring system.

Such a distance measuring apparatus includes two lenses that are arranged side by side either horizontally or vertically and an imager with two image capturing areas that are associated with the two lenses, respectively. The two lenses produce images on their associated image capturing areas and the distance to the object can be determined by carrying out triangulation based on the parallax between those two images.

FIG. 23 illustrates how a distance measuring apparatus carries out triangulation. In FIG. 23, illustrated are a first imaging optical system with an image capturing lens L1 and a second imaging optical system with an image capturing lens L2. These imaging optical systems are arranged so that respective optical axes a1 and a2 of the first and second imaging optical systems run parallel to each other with a predetermined interval B left between them. A line segment that connects together the intersection between the optical axis a2 of the second imaging optical system and an image capturing plane N2 and the intersection between the optical axis a1 of the first imaging optical system and an image capturing plane N1 is called a "base line", which is a line segment that never varies according to the position of the object and is used as a reference for triangulation. The length of that base line is equal to the interval B. Thus, the base line length will be identified herein by "B".

The image of the object O of range finding is produced by the image capturing lenses L1 and L2 on the image capturing planes N1 and N2, respectively. In FIG. 23, a point P on the object O of range finding is supposed to be a measuring point. If the point P is located on the optical axis a1 of the first imaging optical system, the image of the point P will be produced at the intersection between the image capturing plane N1 and the optical axis a1 of the first imaging optical system. On the image capturing plane N2, on the other hand, the image of the point P will be produced at a distance $\Delta$ from the intersection between the image capturing plane N2 and the optical axis a2 of the second imaging optical system. This distance is called a "parallax" and its magnitude is called the "magnitude $\Delta$ of parallax".

Supposing the focal length of the image capturing lenses L1 and L2 of the first and second imaging optical systems is identified by f, the following approximation equation is satisfied:

$$\Delta \approx B \cdot \frac{f}{Z} \qquad (1)$$

The images produced on the image capturing planes N1 and N2 are subjected to correction, division and other kinds of processing so as to be processed easily by computational processing. By making pattern matching between the images produced on the image capturing planes N1 and N2 after they have been subjected to those kinds of processing, the amount of parallax $\Delta$ can be obtained. And by substituting the amount of parallax $\Delta$ calculated, the base line length B and the focal length f into Equation (1), the distance Z can be obtained.

Patent Document No. 1 discloses a distance measuring apparatus that uses a positive meniscus simple lens, having a convex surface on its object plane, to increase the focal length without increasing the overall length of the lens.

On the other hand, Patent Document No. 2 discloses modified lens configurations that were researched to provide an image capturing lens with good telecentric property and an easily adjustable lens aberration.

Citation List

Patent Literature

Patent Document No. 1: Japanese Patent Application Laid-Open Publication No. 2003-15029

Patent Document No. 2: Japanese Patent Application Laid-Open Publication No. 2002-98885

SUMMARY OF INVENTION

Technical Problem

In a distance measuring apparatus, the greater the magnitude $\Delta$ of parallax, the higher the accuracy of range finding (i.e., the distance measured) will be. According to Equation (1), the longer the base line length B and the focal length f, the greater the magnitude $\Delta$ of parallax and the higher the accuracy of range finding will be. Also, the closer the degrees of image capturing performances of the respective imaging optical systems that make up the distance measuring apparatus, the higher the accuracy of range finding will be. Actually, however, there is some lens surface decentration of several μm in a normal lens due to a precision limit of its mold or some variation to occur inevitably during its manufacturing process. As used herein, the "lens surface decentration" refers to a situation where the respective optical axes of two planes of the same lens are misaligned from each other. If a lens had such decentration, the rotational symmetry of the image capturing performance would be lost. In a situation where the imaging optical system consists of only one lens, the image capturing performance would be hardly affected by such decentration. When pattern matching is carried out by a distance measuring apparatus, however, the decentration would cause a significant decrease in range finding accuracy, which is a problem. In other words, even a degree of lens decentration permissible for an image capturing lens for a camera, for example, could be impermissible for a distance measuring apparatus's lens in some cases.

Furthermore, in a distance measuring apparatus, the optical axes of the respective imaging optical systems should be arranged parallel to each other with as high accuracy as possible. If the lenses were provided as two separate ones, however, it would be difficult to align the respective optical axes of those lenses with each other with high accuracy.

Meanwhile, if the lenses are formed as a single integrated array of lenses, then the respective optical axes of the lenses can be aligned with each other with high accuracy. To form such an integrated array of lenses, a mold with multiple concave or convex portions (where the lenses will be formed) is used. Nevertheless, there is also an accuracy limit to the shapes of those concave or convex portions, and therefore, it is also difficult to eliminate the decentration of the respective lenses completely. On top of that, the mold for use to form such an integrated array of lenses should be prepared as upper and lower halves separately from each other, and therefore, it is difficult to make the lens pitches perfectly agree with each other between the upper and lower lenses. In such a situation where the pitches are different between the upper and lower lenses, even if the decentration of one of the two lenses could be reduced to a certain degree by adjusting the optical axes for the upper and lower halves of the mold, the other lens would still cause a lot of decentration. Consequently, even if those lenses are formed as an integrated array of lenses, the decline in range finding accuracy cannot be checked.

Furthermore, Patent Document No. 1 discloses an arrangement of lenses for a distance measuring apparatus but is silent about the potential decline in range finding accuracy due to a difference in image capturing performance between the respective lenses that could be produced by some manufacturing error.

Moreover, what is disclosed by Patent Document No. 2 is image capturing lenses, not ones for use in a distance measuring apparatus, and Patent Document No. 2 discloses nothing about the configuration or effect of those lenses that could be used for a distance measuring apparatus.

It is therefore an object of the present invention to provide a distance measuring apparatus that has a number of simple lenses and that will produce little decline in range finding accuracy even if the lens surfaces have some degree of decentration.

Solution to Problem

A distance measuring apparatus according to the present invention determines the distance to an object of range finding based on the amount of parallax between multiple images. The distance measuring apparatus includes: a number of simple lenses in substantially the same shape, on which light that has come from the object of range finding is incident; and an image capturing section, which has a number of image capturing areas, each facing an associated one of the simple lenses, and which captures the images of the object of range finding that have been produced by the respective simple lenses on their associated image capturing areas. The lens surfaces of each lens that are opposed to the object of range finding and the image capturing section, respectively, are only aspheric refracting surfaces. In each of the simple lenses, the paraxial radii of curvature R1 and R2 of the lens surfaces that are opposed to the object of range finding and the image capturing section, respectively, and its focus length f satisfy the condition $$-2.4 \leq f(1/R1+1/R2) \leq -0.6 \quad (2)$$

In one preferred embodiment, the distance measuring apparatus further satisfies the condition $$-2.0 \leq f(1/R1+1/R2) \leq -0.85 \quad (3)$$

In another preferred embodiment, the simple lenses are formed as an integrated array of lenses.

ADVANTAGEOUS EFFECTS OF INVENTION

According to the present invention, even if there is some degree of decentration between the lens surfaces of a simple lens that are opposed to the object and to the image plane, respectively, and if the degree of decentration varies from one simple lens to another, a distance measuring apparatus that will produce little decline in range finding accuracy is still realized.

BRIEF DESCRIPTION OF DRAWINGS

FIG. 1 schematically illustrates a preferred embodiment of a distance measuring apparatus according to the present invention.

FIG. 2 illustrates conceptually how to carry out a simulation according to a preferred embodiment of the present invention.

DESCRIPTION OF EMBODIMENTS

Figure 3:
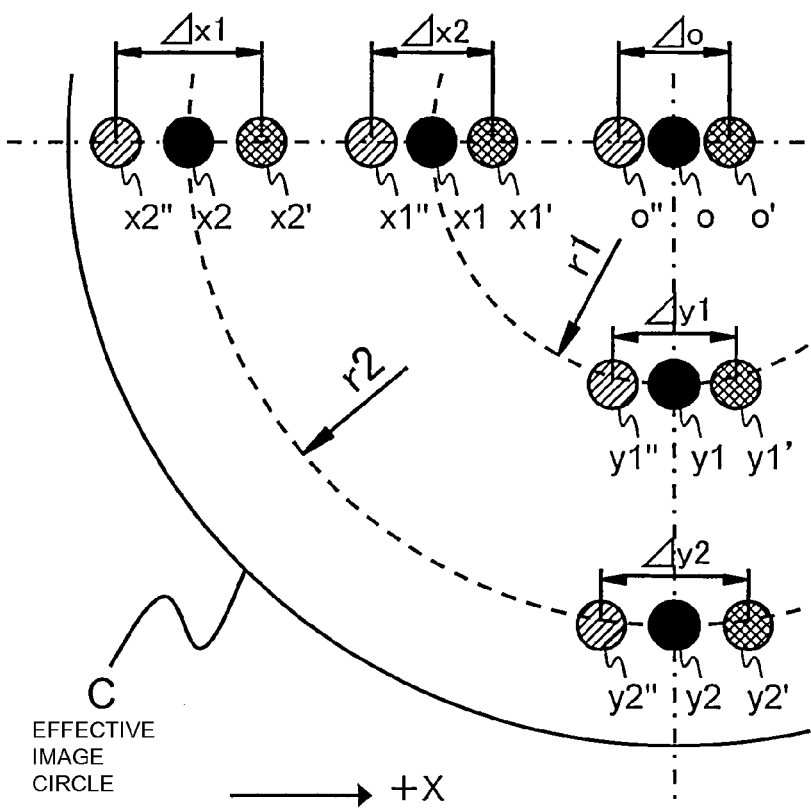
FIG. 3 illustrates how the captured image patterns will shift in a situation where there is some decentration in the lens in the simulation model illustrating a preferred embodiment of the present invention.

FIG. 1 schematically illustrates a preferred embodiment of a distance measuring apparatus according to the present invention. The distance measuring apparatus of this preferred embodiment determines the distance to an object of range finding (not shown) by the amount of parallax between images.

As shown in FIG. 1, the distance measuring apparatus of this preferred embodiment includes multiple simple lenses L1 and L2 on which the light that has come from the object of range finding is incident, an image capturing section N with multiple image capturing areas N1 and N2 that face the simple lenses L1 and L2, respectively, and a computational processor C, which is connected to the image capturing section N.

Those simple lenses L1 and L2 have substantially the same shape. That is to say, the respective lens surfaces r1 of the simple lenses L1 and L2 that are opposed to the object of range finding have substantially the same shape. And the same goes for the respective lens surfaces r2 of the simple lenses L1 and L2 that are opposed to the image capturing section N. Nevertheless, the shapes of the simple lenses L1 and L2 themselves could be slightly different from each other due to some inevitable variation in mold precision or an error that should occur during the manufacturing process.

All of the lens surfaces r1 and r2 of the simple lenses L1 and L2 consist of only aspheric refracting surfaces. It should be noted that a surface with a diffraction grating is not a "refracting surface" in the sense used in this description. Since the respective lens surfaces r1 and r2 of the simple lenses L1 and L2 have no diffraction gratings, it is possible to avoid an unwanted situation where the accuracy of range finding is affected by the flare caused by unnecessary diffracted light.

In FIG. 1, each of the simple lenses L1 and L2 has not only the lens surfaces r1 and r2 but also a cut end e, which is located on the outer periphery of the simple lenses L1 and L2 to connect the lens surfaces r1 and r2 together.

The image capturing section N captures the images of the object of range finding that have been produced by the simple lenses L1 and L2 on the image capturing areas N1 and N2, respectively.

In the example illustrated in FIG. 1, two imagers are provided for the two lenses one to one. Alternatively, the image capturing area of a single imager may be split into two so that the two image capturing areas are associated with the two lenses on a one to one basis.

The computational processor C calculates the distance to the object of range finding (not shown) based on the parallax between the images captured by the image capturing section N.

Supposing in the simple lenses L1 and L2, the paraxial radii of curvature of the lens surfaces r1 and r2 that are opposed to the object of range finding and the image capturing section N, respectively, are identified by R1 and R2 and its focus length is identified by f, then the distance measuring apparatus of this preferred embodiment satisfies the following inequality (2):

$$-2.4 \leq f(1/R1 + 1/R2) \leq -0.6 \quad (2)$$

According to this preferred embodiment, even if in each of the multiple simple lenses, there is some degree of decentration between the respective lens surfaces that are opposed to the object and the image plane due to some manufacturing error and if the magnitudes of errors are different between multiple optical systems of the distance measuring apparatus, the decline in range finding accuracy can be minimized by satisfying this inequality (2). It should be noted that f is determined by the designed angle of view. That is why if a single lens is designed with R1 fixed at a certain value, possible R2 values will be limited to only a narrow range.

The distance measuring apparatus of this preferred embodiment preferably also satisfies the following inequality (3):

$$-2.0 \leq f(1/R1 + 1/R2) \leq -0.85 \quad (3)$$

By satisfying this inequality (3), the decline in range finding accuracy can be further reduced.

In the example illustrated in FIG. 1, the simple lenses L1 and L2 are supposed to be provided as two separate ones. However, these simple lenses L1 and L2 may be formed as an integrated array of lenses. Even so, if one of the inequalities (2) and (3) is satisfied, the decline in range finding accuracy can also be minimized. On top of that, if those simple lenses L1 and L2 are formed as an integrated array, the accuracy can be increased so much in the optical axis direction between multiple optical systems that there is no need to make optical axis adjustment between those optical systems. In addition, the distance measuring apparatus can be assembled more easily, too.

Hereinafter, it will be described, using a simulation model, how a captured image pattern will shift in a situation where there is some degree of decentration between the lens surfaces of a simple lens that are opposed to the object and the image plane, respectively. As the decentration between the lens surfaces that are located closer to the object and the image plane (or image capturing section) is a relative one, the lens surface opposed to the object and the image plane are supposed to be fixed and some degree of decentration is supposed to be produced on the lens surface opposed to the image plane according to this simulation model. FIG. 2 illustrates conceptually how this simulation is carried out. Specifically, in the simulation model illustrated in FIG. 2, an image capturing lens L and a plane chart H, which is located at a distance of 600 mm from the image capturing lens L, are arranged. On this plane chart H, drawn are multiple circular patterns O, X1, X2, Y1 and Y2 with a diameter of 1 mm. More specifically, the circular pattern O is located at the origin of the plane chart H, the circular patterns X1 and X2 are located on the X-axis, and the circular patterns Y1 and Y2 are located on the Y-axis. On the other side of the image capturing lens L, an effective image circle C (=ϕC) is illustrated as an image capturing area for the image capturing lens L opposite to the plane chart H. In the effective image circle C, the circular patterns O, X1, X2, Y1 and Y2 on the plane chart H are imaged as captured image patterns o, x1, x2, y1 and y2, respectively. More specifically, the captured image pattern o is located on the optical axis of the effective image circle C. On the other hand, the captured image patterns x1 and x2 are located at mutually different distances, which are respectively 40% and 80% of the maximum image height (i.e., the radius of the effective image circle C), from the origin in the +x direction. In the same way, the captured image patterns y1 and y2 are located at mutually different distances, which are respectively 40% and 80% of the maximum image height, from the origin in the +y direction. In other words, the locations of the circular patterns O, X1, X2, Y1 and Y2 on the plane chart H are determined so that the captured image patterns o, x1, x2, y1 and y2 are located at such positions.

FIG. 3 illustrates how the captured image patterns will shift in a situation where there is some decentration on the lens surface of the lens L that is opposed to the image plane in the simulation model illustrated in FIG. 2. If decentration has been produced in the +X direction on the lens surface opposed to the image plane, the captured image patterns o, x1, x2, y1 and y2 will shift and be captured as patterns o', x1', x2', y1' and y2', respectively. On the other hand, if decentration has been produced in the −X direction on the lens surface opposed to the image plane, the captured image patterns o, x1, x2, y1 and y2 will shift and be captured as patterns o", x1", x2", y1" and y2", respectively. Also, Δo, Δx1, Δx2, Δy1 and Δy2 denote the respective magnitudes of pattern location shift of the captured image patterns o', x1', x2', y1' and y2' with respect to the captured image patterns o", x1", x2", y1" and y2". If decentration has been produced on the lens surface of the lens L opposed to the image plane, the magnitude of shift will vary according to the image capturing position.

Figure 4:
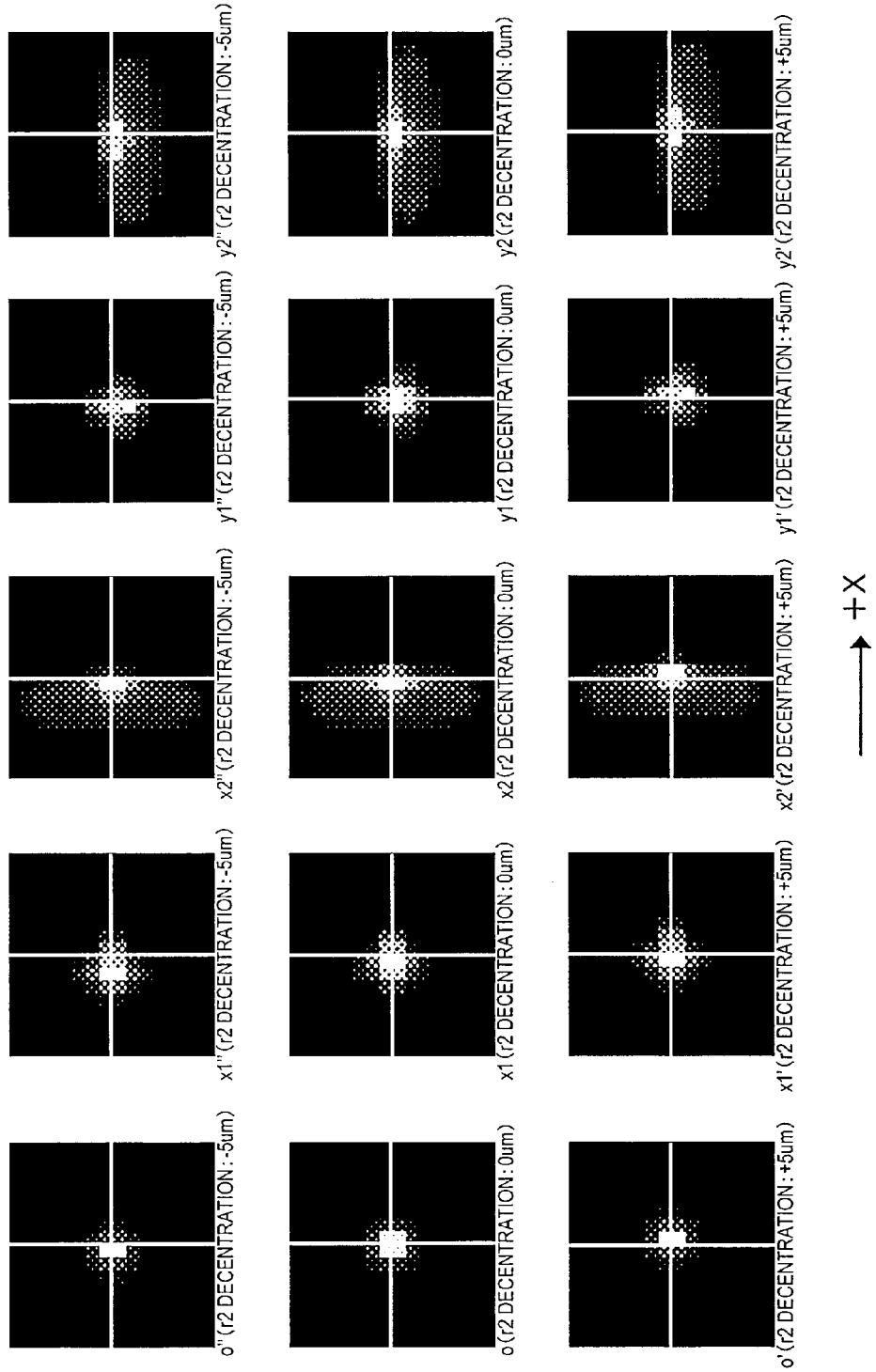
FIG. 4 illustrates respective captured image patterns obtained by simulation and illustrating a preferred embodiment of the present invention.

FIG. 4 illustrates the illuminance distributions of the respective captured image patterns obtained by simulation. The results of this simulation were obtained by analyzing an imaging optical system with a focal length of 5.3 mm, an effective image capturing circle diameter of φ5.0 mm, and an imager pixel pitch of 6 μm by ray tracing. In the respective illuminance distributions of the captured image patterns o", x1", . . . and y2' shown in FIG. 4, 16 by 16 pixels are arranged in matrix, and the higher the illuminance of a pixel, the higher the lightness of the pixel illustrated. Nevertheless, for display purposes, the degree of lightness is indicated by the percentage of the white area in each pixel. In these illuminance distributions, each of the square areas that are arranged in a grid pattern represents a single pixel.

Compare the illuminance distributions of the respective captured image patterns o, o' and o" to each other with reference to FIG. 4, and it can be seen that a portion of the captured image pattern o" with the highest illuminance (i.e., the portion in white) is the two pixels that are arranged vertically at the center of the illuminance distribution diagram. On the other hand, a portion of the captured image pattern o with the highest illuminance is the four pixels that are arranged in two columns and two rows at the center of the illuminance distribution diagram. The center of that portion of the captured image pattern o" with the highest illuminance has shifted in the −x direction with respect to that of the portion of the captured image pattern o with the highest illuminance. Meanwhile, the center of that portion of the captured image pattern o' with the highest illuminance has shifted in the +x direction with respect to that of the portion of the captured image pattern o with the highest illuminance. Likewise, in the other captured image patterns x1, x1', . . . and y", the center of their portions with the highest illuminance has also shifted in the x directions. These results reveal that the captured image pattern will shift under the influence of decentration.

Furthermore, the magnitudes of shifts between the captured image patterns o, o' and o" are different from those of shifts between the captured image patterns x1, x1' and x1", for example. As can be seen from these results, if some decentration has been produced, the magnitude of shift of each captured image pattern will vary according to its location.

In the field of range finding, the parallax is derived by doing pattern matching. That is why the magnitudes Δo, Δx1, Δx2 and Δy1 of shifts of the captured image patterns are also derived by doing pattern matching. In carrying out pattern matching, the degree of correlation is obtained by an evaluation function called "SAD", which is the sum of the absolute differences in pixel intensity between a given small area and a reference small area. Supposing the calculation block size of the small area is given by m×n pixels, the SAD is calculated by the following Equation (4):

$$\sum_{i=0}^{m-1}\sum_{j=0}^{n-1} |I0(i, j) - I1(1 + dx, j)| \qquad (4)$$

Figure 5:
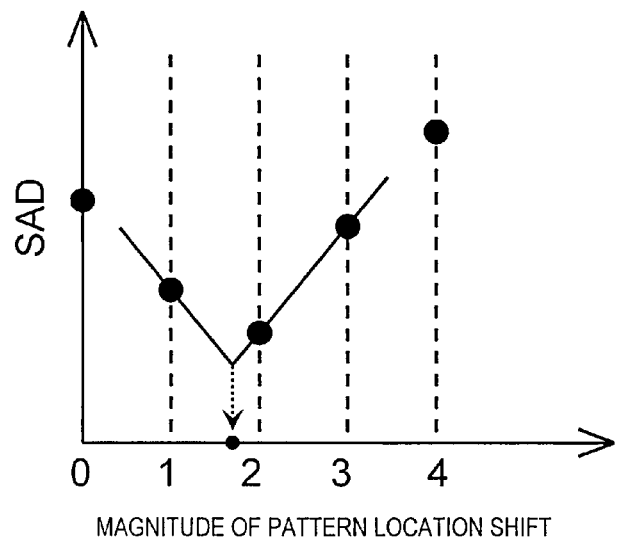
FIG. 5 is a graph illustrating how to calculate the SAD.

In Equation (4), i and j represent the coordinates of the calculation block and I0 and I1 respectively represent the intensity values in the given and reference areas, of which the locations are specified by the coordinates in the parentheses. The SAD is calculated with the reference search block area moved with respect to the given calculation block area. And the magnitude of movement associated with a local minimum SAD is the magnitude of shift described above. According to this simulation, the search block is supposed to be moved in the +X direction shown in FIG. 2. FIG. 5 is a graph illustrating how to calculate the SAD. In this example, the SAD is calculated on a pixel-by-pixel basis. However, the SAD can also be calculated on a subpixel basis by performing some interpolation processing.

As described above, if some decentration has been produced on the lens surface opposed to the image plane, then the magnitude of shift of each captured image pattern will vary according to the image capturing position. Consequently, the accuracy of range finding will decrease according to the image capturing position. That is why if the lens shape is determined so that the magnitude of shift hardly depends on the image capturing position in a situation where some decentration has been produced on the lens surface opposed to the image plane, the decline in range finding accuracy can be minimized. From such a point of view, the present inventors carried out experiments to find how the magnitude of shift of each captured image pattern at each image capturing position varied with the lens shape (i.e., the f(1/R1+1/R2) value). The results will be described below.

Figure 6:
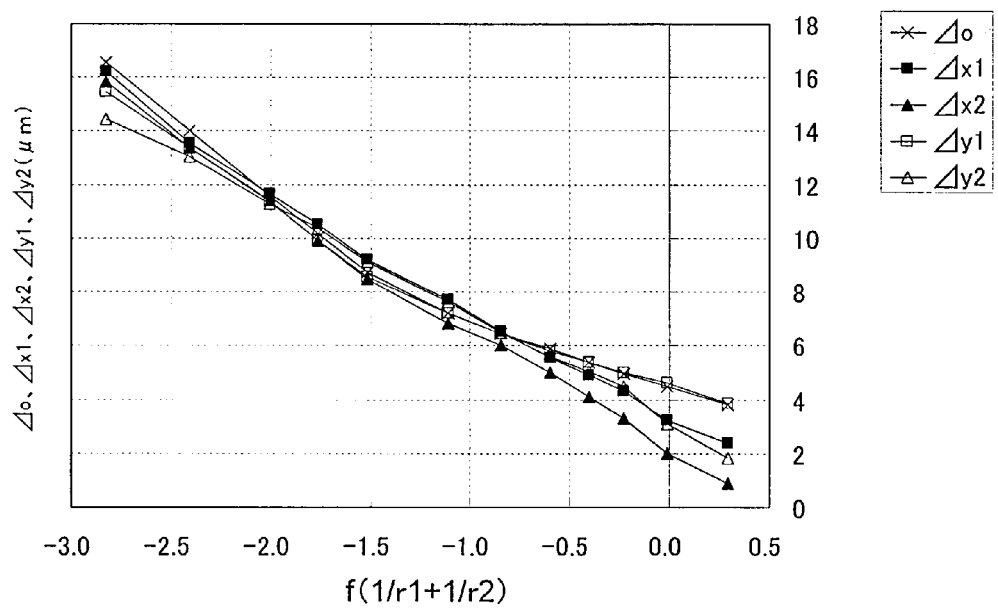
FIG. 6 is a graph showing how the magnitude of shift of a captured image pattern varied according to the lens shape (represented by the f(1/R1+1/R2) value) in a situation where decentration was produced on the lens surface opposed to the image plane.

FIG. 6 is a graph showing how the magnitude of shift of a captured image pattern varied according to the lens shape (represented by the f(1/R1+1/R2) value) in a situation where decentration was produced on the lens surface opposed to the image plane. If the f(1/R1+1/R2) value, which is the abscissa of this graph, is small, then that lens is a positive meniscus lens that is convex toward the image plane. But as that value increases, that lens gradually transforms into a double-convex lens. And if the value further increases, then the lens will gradually transform into a positive meniscus lens that is convex toward the object. The ordinate of this graph represents the magnitudes of difference of shifts Δo, Δx, Δx2, Δy1 and Δy2 of the captured image patterns in a situation where an decentration of 5 μm was produced in the +X direction on the lens surface opposed to the image plane with respect to the captured image patterns in a situation where an decentration of 5 μm was produced in the −X direction.

Figure 7:
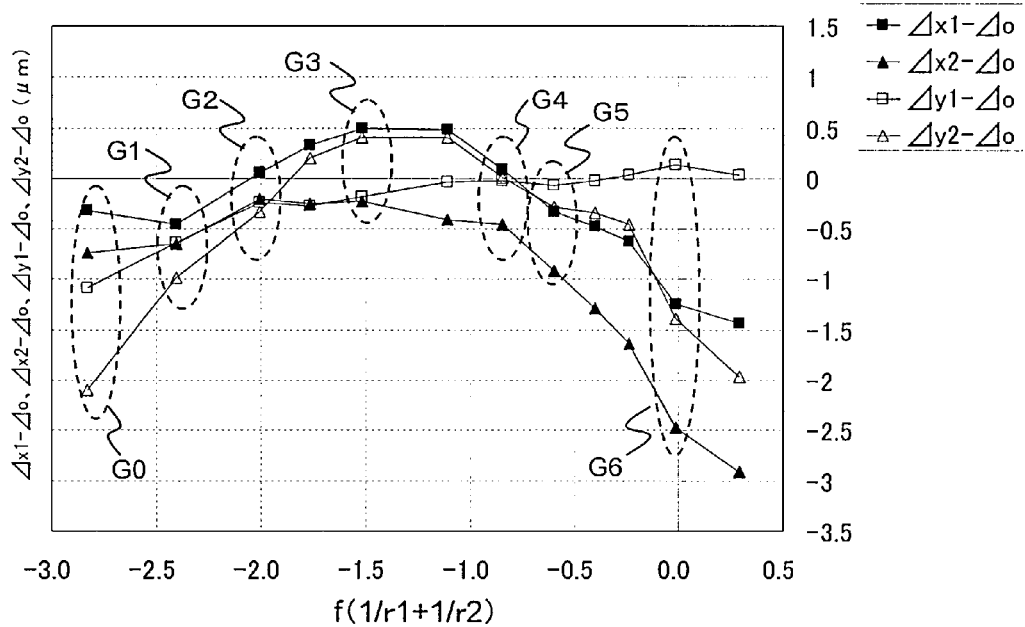
FIG. 7 is a graph illustrating a corrected magnitude of relative shift of a captured image pattern when some degree of decentration is produced on the lens surface opposed to the image plane so that the magnitude of shift becomes equal to zero at the origin.

Generally speaking, in calculating the distance to the object by range finding, the amount of parallax on and near the optical axis is corrected by calibration. That is why if Δx1, Δx2, Δy and Δy2 are corrected by subtracting Δo from each of them so that Δo becomes equal to zero in the graph shown in FIG. 6, then the graph of FIG. 7, which shows the magnitude of shift of each image capturing position in a situation where the magnitude of relative shift of the pattern on the optical axis is zero, can be obtained. As shown in the graph of FIG. 7, in groups G1, G2, G3, G4 and G5, the magnitude of shift of the captured image pattern depends less on the image capturing position than in the other groups G0 and G6. These results reveal that if the abscissa falls within the range of −2.4 to −0.6 (i.e., if Inequality (2) is satisfied), the decline in range finding accuracy can be minimized. It can also be seen from FIG. 7 that in the groups G2, G3 and G4, the dependence of the magnitude of shift of the captured image pattern on the image capturing position can be reduced particularly significantly. As can be seen from these results, if the abscissa falls within the range of −2.0 through −0.85 (i.e., if Inequality (3) is satisfied), the decline in range finding accuracy can be reduced particularly significantly.

Hereinafter, a specific preferred embodiment of the present invention that meets the condition set by Inequality (2) will be described.

Embodiment 1

Figure 8:
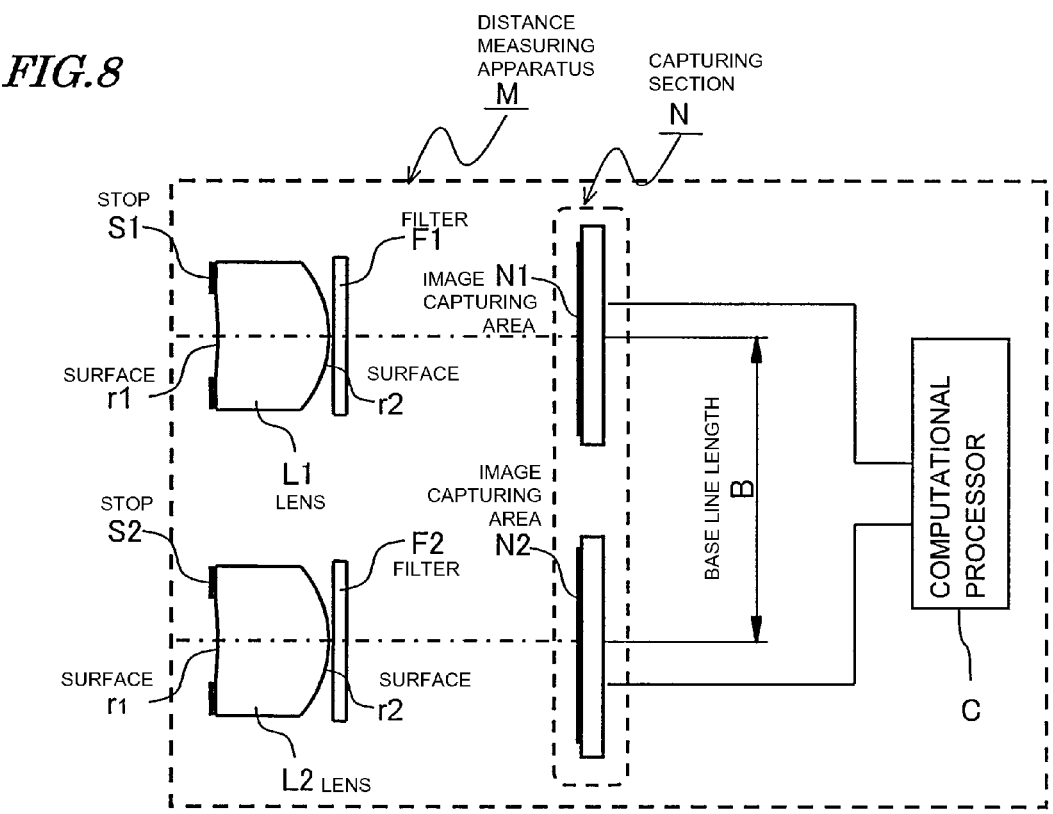
FIG. 8 is a cross-sectional view schematically illustrating a first preferred embodiment of a distance measuring apparatus according to the present invention.

FIG. 8 is a cross-sectional view schematically illustrating a first preferred embodiment of a distance measuring apparatus according to the present invention. The distance measuring apparatus M shown in FIG. 8 includes simple lenses L1 and L2, each of which is provided for its associated optical system and which has a surface r1 opposed to the object of range finding and another surface r2 opposed to its associated image capturing area, an image capturing section N with image capturing areas N1 and N2 that face the simple lenses L1 and L2, respectively, and a computational processor connected to the image capturing section N.

Stops S1 and S2 are arranged on one surface r1 of the simple lenses L1 and L2, respectively. And filters F1 and F2 are arranged on the other surface r2 of the simple lenses L1 and L2, respectively (i.e., between the simple lenses L1 and L2 and the image capturing areas N1 and N2). B denotes the base line length of the distance measuring apparatus.

Figure 9:
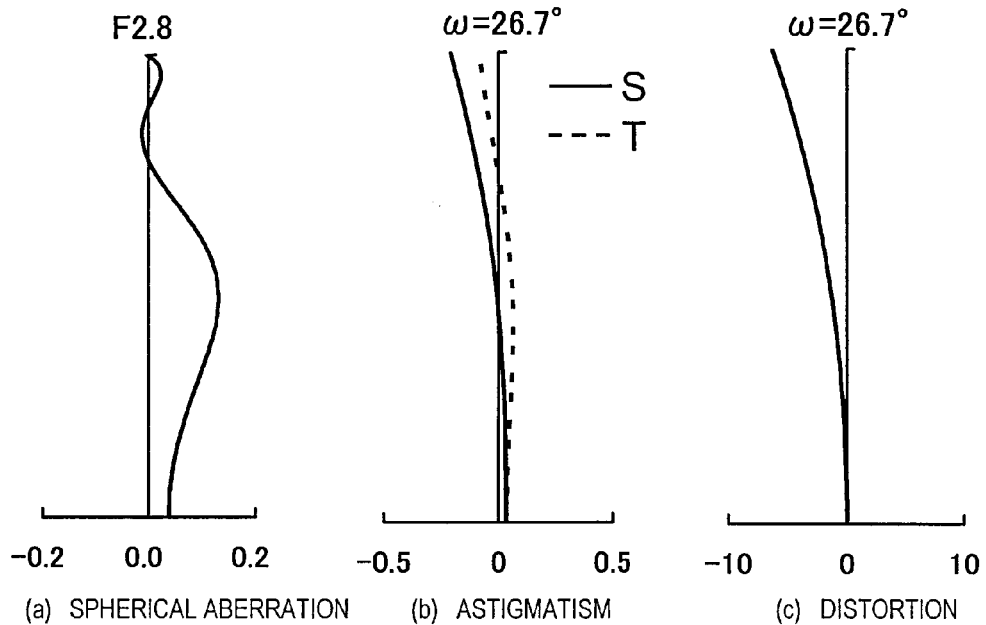
FIGS. 9(a) to 9(c) show how much spherical aberration, astigmatism and distortion were observed in the distance measuring apparatus as the first preferred embodiment of the present invention.

The following Table 1 summarizes design data for the optical systems of the distance measuring apparatus shown in FIG. 8. And FIG. 9 shows the spherical aberration, astigmatism and distortion. It can be seen from FIG. 9 that all of these errors were corrected sufficiently.

TABLE 1

Lens data: focal length f = 5.3 mm, F value = 2.8, designed dominant wavelength λ = 880 nm, angle of view 2 ω = 53.4 degrees, and effective image capturing circle diameter = φ5 mm

| Plane No. | Ri | di | nd | vd |
|---|---|---|---|---|
| Object | ∞ | 600 | — | — |
| Stop | ∞ | 0.15 | — | — |
| R1 surface | −18.5 | 2.56 | 1.5253 | 56.0 |
| R2 surface | −2.50196 | 0.1 | — | — |
| Filter 1 surface | ∞ | 0.3 | 1.5168 | 64.2 |
| Filter 2 surface | ∞ | 5.26 | — | — |
| Image plane | ∞ | — | — | — |

Aspheric coefficient

| | k | A4 | A6 | A8 | A10 | A12 |
|---|---|---|---|---|---|---|
| R1 surface | 0 | −0.025915 | −0.0093512 | 0.100357 | −0.15048 | 0.066112 |
| R2 surface | −2.18644 | −0.013016 | −0.0048554 | 0.0033070 | −0.0010397 | 0.00011395 |

In Table 1, Ri denotes the paraxial radius of curvature (mm), di denotes the interval (mm) between the respective centers of the planes, nd denotes the d-line refractive index of the lens or the filter, and vd denotes the Abbe number of the d line of the lens or the filter. On the other hand, supposing the distance as measured in the optical axis direction from a plane that contacts with the top of the plane is identified by x, the height as measured from the optical axis is identified by h, and r, k and Am (where m=4, 6, 8, 10 or 12) denote the paraxial radius of curvature, the conic constant and the $m^{th}$ aspheric coefficient, respectively, the aspheric shape is represented by the following Equation (5):

$$x = \frac{\frac{1}{r}h^2}{1 + \sqrt{1 - (1+k)\left(\frac{1}{r}\right)^2 h^2}} + \frac{A_4 h^4 + A_6 h^6 + A_8 h^8 +}{A_{10} h^{10} + A_{12} h^{12}} \quad (5)$$

If the focal length f, the paraxial radius of curvature R1 of the lens surface opposed to the object, and radius of curvature R2 of the lens surface opposed to the image plane of this preferred embodiment are substituted into Inequality (2), then the resultant value will be −2.40, which falls within the range defined by Inequality (2). Also, the magnitudes of relative pattern location shifts Δx1-Δo, Δx2-Δo, Δy1-Δo, and Δy2-Δo of this preferred embodiment correspond to the data plotted as the curve G1 in the graph shown in FIG. 7.

According to this preferred embodiment, the condition set by Inequality (2) is met, and therefore, the magnitude of relative pattern location shift when some degree of decentration is produced will vary to a lesser degree according to the image capturing position than a situation where the condition set by Inequality (2) is not met. As a result, the amount of parallax detected will also vary to a lesser degree according to the image capturing position. Consequently, the distance to the object can be determined more accurately by Equation (1).

Embodiment 2

Figure 10:
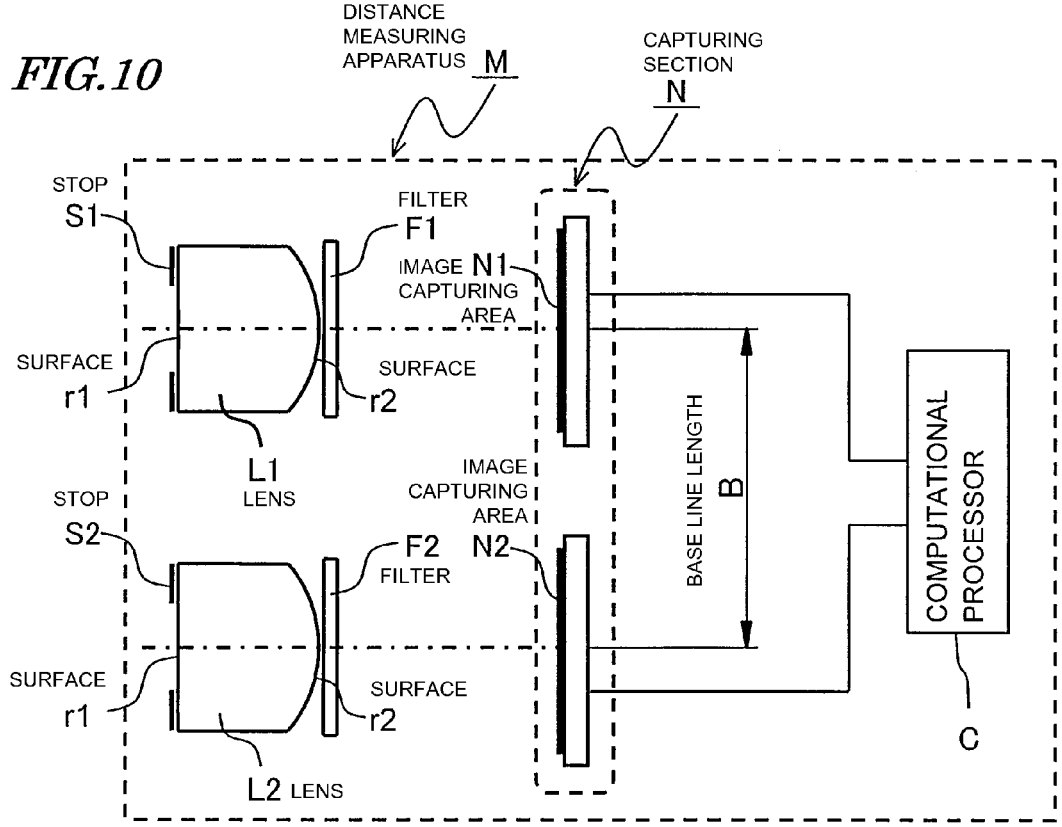
FIG. 10 is a cross-sectional view schematically illustrating a second preferred embodiment of a distance measuring apparatus according to the present invention.

FIG. 10 is a cross-sectional view schematically illustrating a second preferred embodiment of a distance measuring apparatus according to the present invention. The lenses L1 and L2 of this preferred embodiment have a different shape from the lenses L1 and L2 of the first preferred embodiment described above. In the other respects, however, this preferred embodiment is quite the same as the first preferred embodiment, and the description thereof will be omitted herein.

Figure 11:
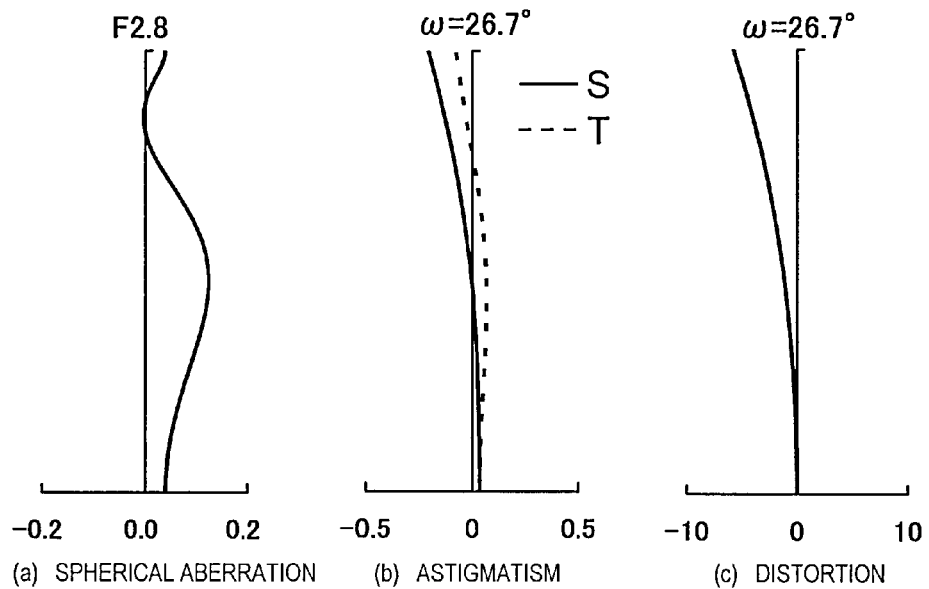
FIGS. 11(a) to 11(c) show how much spherical aberration, astigmatism and distortion were observed in the distance measuring apparatus as the second preferred embodiment of the present invention.

The following Table 2 summarizes design data for the optical systems of the distance measuring apparatus shown in FIG. 10. In Table 2, the respective signs have the same meanings as their counterparts of the first preferred embodiment. And FIG. 11 shows the spherical aberration, astigmatism and distortion. It can be seen from FIG. 11 that all of these errors were corrected sufficiently.

TABLE 2

Lens data: focal length f = 5.3 mm, F value = 2.8, designed dominant wavelength λ = 880 nm, angle of view 2ω = 53.3 degrees, and effective image capturing circle diameter = φ5 mm

| Plane No. | Ri | di | nd | νd |
|---|---|---|---|---|
| Object | ∞ | 600 | — | — |
| Stop | ∞ | 0.15 | — | — |
| R1 surface | −120 | 3.07 | 1.5253 | 56.0 |
| R2 surface | −2.70558 | 0.1 | — | — |
| Filter 1 surface | ∞ | 0.3 | 1.5168 | 64.2 |
| Filter 2 surface | ∞ | 5.055 | — | — |
| Image plane | ∞ | — | — | — |

Aspheric coefficient

| | k | A4 | A6 | A8 | A10 | A12 |
|---|---|---|---|---|---|---|
| R1 surface | 0 | −0.022523 | 0.0060635 | 0.051569 | −0.085826 | 0.037062 |
| R2 surface | −0.34748 | 0.0023391 | −0.0031296 | 0.0014661 | −0.00030462 | 0.000020015 |

If the focal length f, the paraxial radius of curvature R1 of the lens surface opposed to the object, and radius of curvature R2 of the lens surface opposed to the image plane of this preferred embodiment are substituted into Inequality (2), then the resultant value will be −2.00, which falls within the ranges defined by Inequalities (2) and (3). Also, the magnitudes of relative pattern location shifts $\Delta x1$-$\Delta o$, $\Delta x2$-$\Delta o$, $\Delta y1$-$\Delta o$, and $\Delta y2$-$\Delta o$ of this preferred embodiment correspond to the data plotted as the curve G2 in the graph shown in FIG. 7.

According to this preferred embodiment, the conditions set by Inequalities (2) and (3) are met, and therefore, the magnitude of relative pattern location shift when some degree of decentration is produced will vary to a lesser degree according to the image capturing position than a situation where the conditions set by Inequalities (2) and (3) are not met. As a result, the amount of parallax detected will also vary to a lesser degree according to the image capturing position. Consequently, the distance to the object can be determined more accurately by Equation (1).

Embodiment 3

Figure 12:
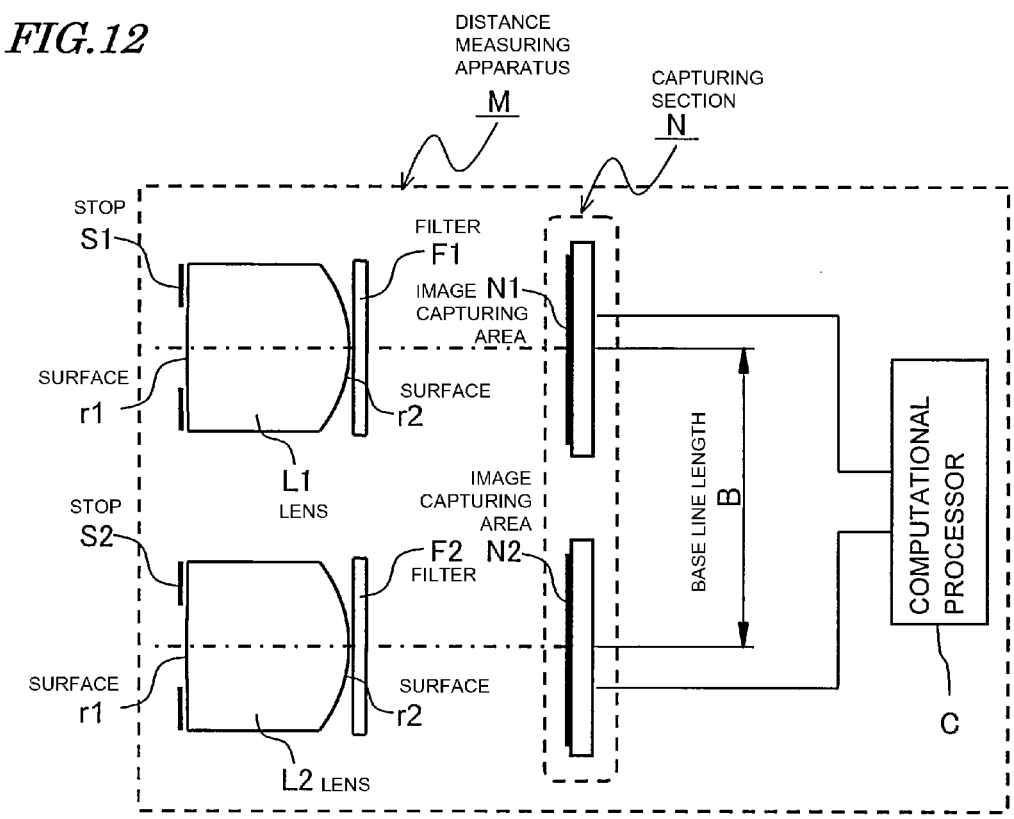
FIG. 12 is a cross-sectional view schematically illustrating a third preferred embodiment of a distance measuring apparatus according to the present invention.

FIG. 12 is a cross-sectional view schematically illustrating a third preferred embodiment of a distance measuring apparatus according to the present invention. The lenses L1 and L2 of this preferred embodiment have a different shape from the lenses L1 and L2 of the first preferred embodiment described above. In the other respects, however, this preferred embodiment is quite the same as the first preferred embodiment, and the description thereof will be omitted herein.

Figure 13:
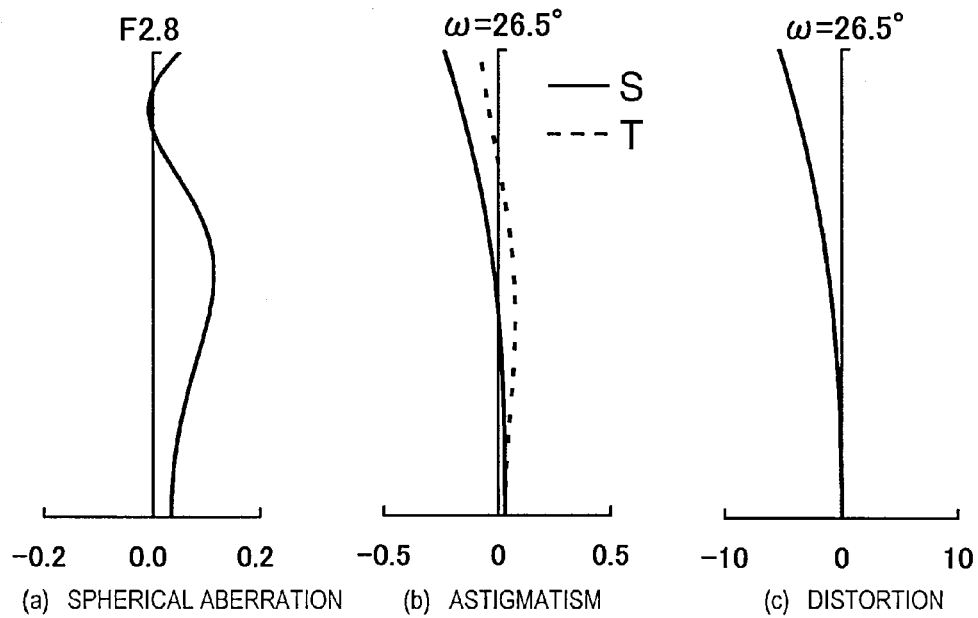
FIGS. 13(a) to 13(c) show how much spherical aberration, astigmatism and distortion were observed in the distance measuring apparatus as the third preferred embodiment of the present invention.

The following Table 3 summarizes design data for the optical systems of the distance measuring apparatus shown in FIG. 12. In Table 3, the respective signs have the same meanings as their counterparts of the first preferred embodiment. And FIG. 13 shows the spherical aberration, astigmatism and distortion. It can be seen from FIG. 13 that all of these errors were corrected sufficiently.

TABLE 3

Lens data: focal length f = 5.3 mm, F value = 2.8, designed dominant wavelength λ = 880 nm, angle of view 2ω = 52.9 degrees, and effective image capturing circle diameter = φ5 mm

| Plane No. | Ri | di | nd | νd |
|---|---|---|---|---|
| Object | ∞ | 600 | — | — |
| Stop | ∞ | 0.15 | — | — |
| R1 surface | 20 | 3.81 | 1.5253 | 56.0 |
| R2 surface | −2.97308 | 0.1 | — | — |
| Filter 1 surface | ∞ | 0.3 | 1.5168 | 64.2 |
| Filter 2 surface | ∞ | 4.67 | — | — |
| Image plane | ∞ | — | — | — |

TABLE 3-continued

Lens data: focal length f = 5.3 mm, F value = 2.8,
designed dominant wavelength λ = 880 nm, angle of
view 2 ω = 52.9 degrees, and effective image capturing circle diameter = φ5 mm Aspheric coefficient

|  | k | A4 | A6 | A8 | A10 | A12 |
|---|---|---|---|---|---|---|
| R1 surface | 0 | −0.013301 | −0.012766 | 0.074004 | −0.087667 | 0.031494 |
| R2 surface | −0.32942 | 0.0038789 | −0.0023363 | 0.00096819 | −0.00018208 | 0.000011720 |

If the focal length f, the paraxial radius of curvature R1 of the lens surface opposed to the object, and radius of curvature R2 of the lens surface opposed to the image plane of this preferred embodiment are substituted into Inequality (2), then the resultant value will be −1.52, which falls within the ranges defined by Inequalities (2) and (3). Also, the magnitudes of relative pattern location shifts $\Delta x1-\Delta o$, $\Delta x2-\Delta o$, $\Delta y1-\Delta o$, and $\Delta y2-\Delta o$ of this preferred embodiment correspond to the data plotted as the curve G3 in the graph shown in FIG. 7.

According to this preferred embodiment, the conditions set by Inequalities (2) and (3) are met, and therefore, the magnitude of relative pattern location shift when some degree of decentration is produced will vary to a lesser degree according to the image capturing position than a situation where the conditions set by Inequalities (2) and (3) are not met. As a result, the amount of parallax detected will also vary to a lesser degree according to the image capturing position. Consequently, the distance to the object can be determined more accurately by Equation (1).

Embodiment 4

Figure 14:
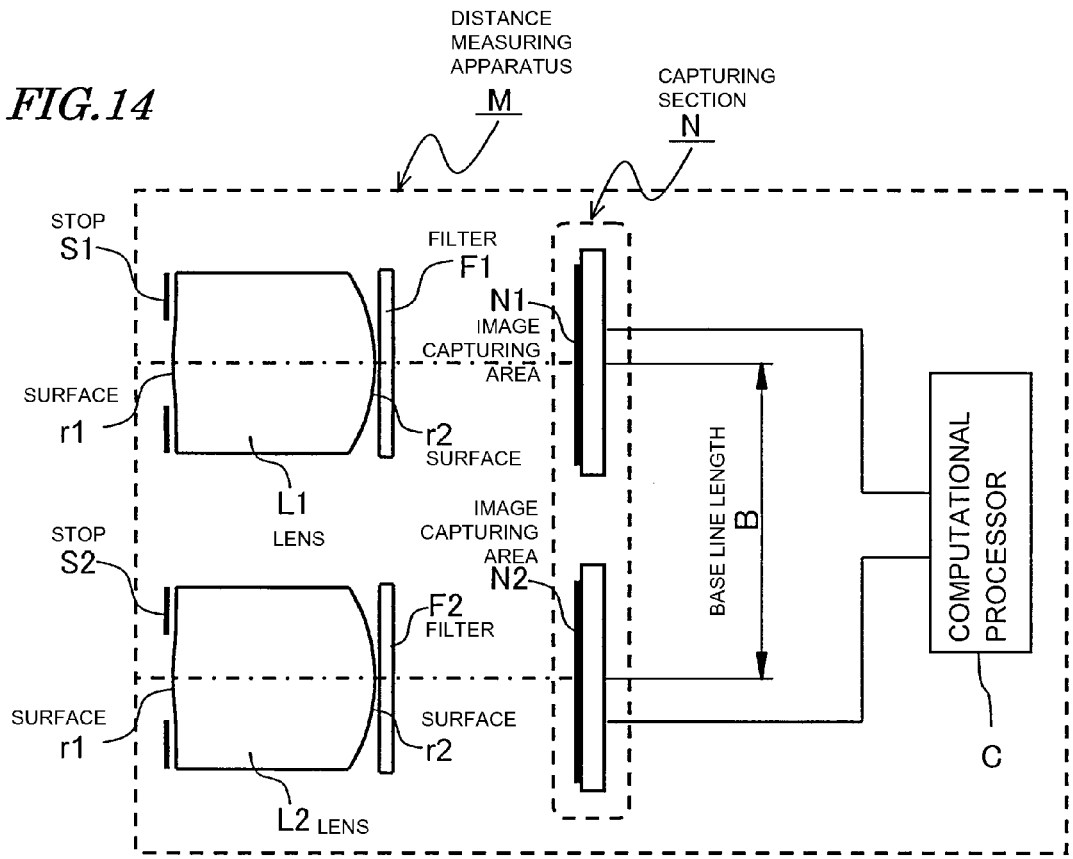
FIG. 14 is a cross-sectional view schematically illustrating a fourth preferred embodiment of a distance measuring apparatus according to the present invention.

FIG. 14 is a cross-sectional view schematically illustrating a fourth preferred embodiment of a distance measuring apparatus according to the present invention. The lenses L1 and L2 of this preferred embodiment have a different shape from the lenses L1 and L2 of the first preferred embodiment described above. In the other respects, however, this preferred embodiment is quite the same as the first preferred embodiment, and the description thereof will be omitted herein.

Figure 15:
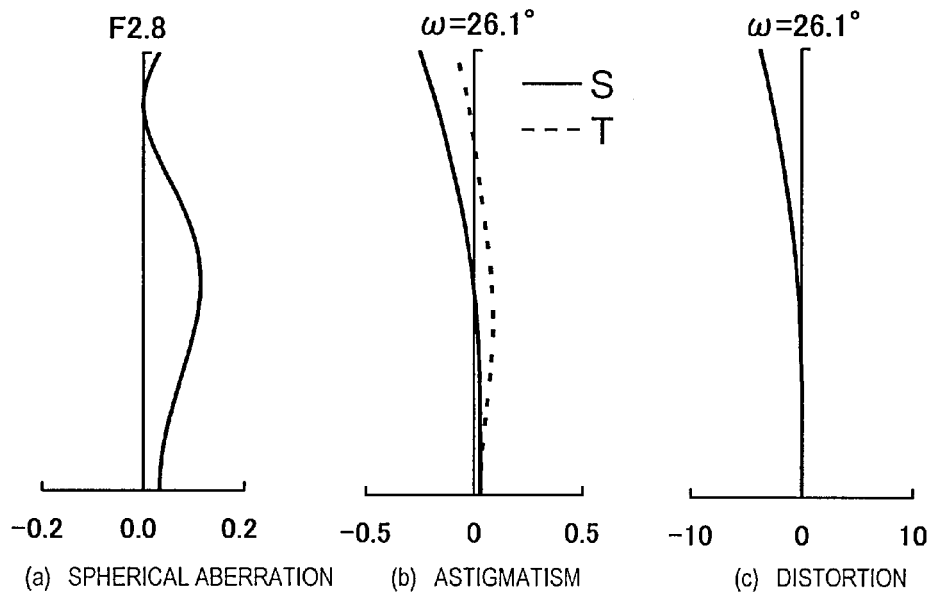
FIGS. 15(a) to 15(c) show how much spherical aberration, astigmatism and distortion were observed in the distance measuring apparatus as the fourth preferred embodiment of the present invention.

The following Table 4 summarizes design data for the optical systems of the distance measuring apparatus shown in FIG. 14. In Table 4, the respective signs have the same meanings as their counterparts of the first preferred embodiment. And FIG. 15 shows the spherical aberration, astigmatism and distortion. It can be seen from FIG. 15 that all of these errors were corrected sufficiently.

TABLE 4

Lens data: focal length f = 5.3 mm, F value = 2.8,
designed dominant wavelength λ = 880 nm, angle of
view 2 ω = 52.1 degrees, and effective image capturing circle diameter = φ5 mm

| Plane No. | Ri | Di | Nd | νd |
|---|---|---|---|---|
| Object | ∞ | 600 | — | — |
| Stop | ∞ | 0.15 | — | — |
| R1 surface | 7.6 | 4.48 | 1.5253 | 56.0 |
| R2 surface | −3.43013 | 0.1 | — | — |
| Filter 1 surface | ∞ | 0.3 | 1.5168 | 64.2 |
| Filter 2 surface | ∞ | 3.95 | — | — |
| Image plane | ∞ | — | — | — |

Aspheric coefficient

|  | k | A4 | A6 | A8 | A10 | A12 |
|---|---|---|---|---|---|---|
| R1 surface | 0 | −0.016585 | 0.025963 | −0.0028650 | −0.020921 | 0.010609 |
| R2 surface | 1.45689 | 0.012323 | −0.0032176 | 0.0022314 | −0.00056933 | 0.000069682 |

If the focal length f, the paraxial radius of curvature R1 of the lens surface opposed to the object, and radius of curvature R2 of the lens surface opposed to the image plane of this preferred embodiment are substituted into Inequality (2), then the resultant value will be −0.85, which falls within the ranges defined by Inequalities (2) and (3). Also, the magnitudes of relative pattern location shifts $\Delta x1-\Delta o$, $\Delta x2-\Delta o$, $\Delta y1-\Delta o$, and $\Delta y2-\Delta o$ of this preferred embodiment correspond to the data plotted as the curve G4 in the graph shown in FIG. 7.

According to this preferred embodiment, the conditions set by Inequalities (2) and (3) are met, and therefore, the magnitude of relative pattern location shift when some degree of decentration is produced will vary to a lesser degree according to the image capturing position than a situation where the conditions set by Inequalities (2) and (3) are not met. As a result, the amount of parallax detected will also vary to a lesser degree according to the image capturing position. Consequently, the distance to the object can be determined more accurately by Equation (1).

Embodiment 5

Figure 16:
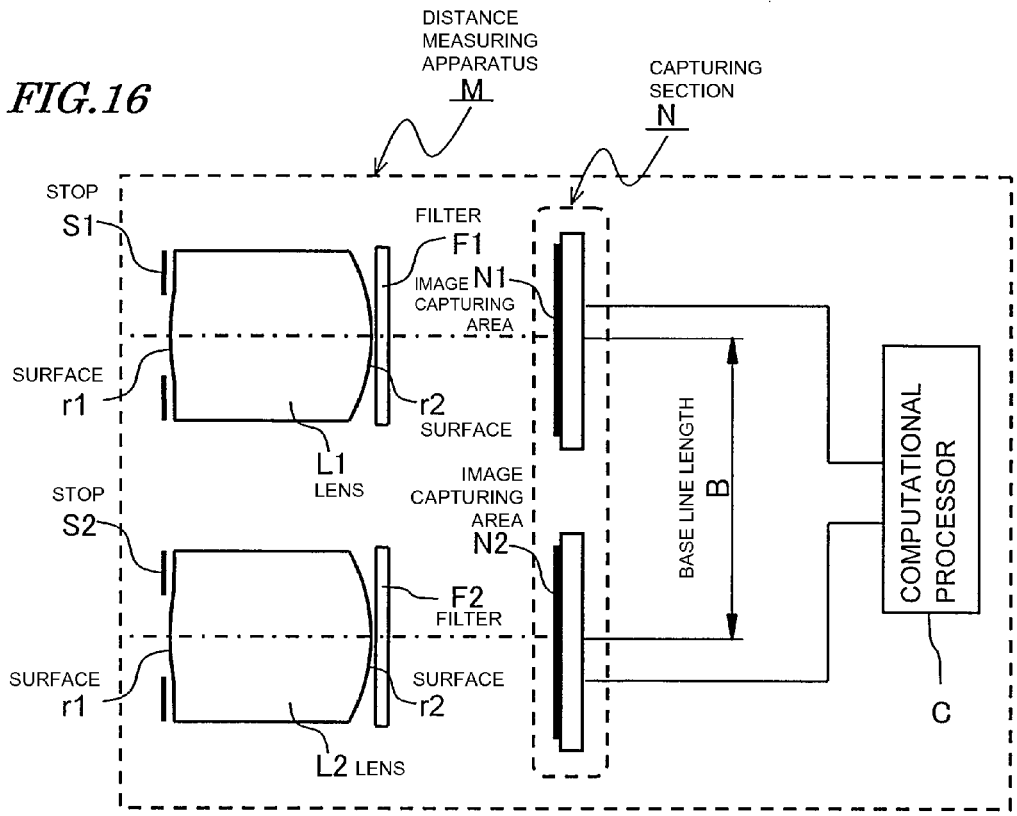
FIG. 16 is a cross-sectional view schematically illustrating a fifth preferred embodiment of a distance measuring apparatus according to the present invention.

FIG. 16 is a cross-sectional view schematically illustrating a fifth preferred embodiment of a distance measuring apparatus according to the present invention. The lenses L1 and L2 of this preferred embodiment have a different shape from the lenses L1 and L2 of the first preferred embodiment described above. In the other respects, however, this preferred embodiment is quite the same as the first preferred embodiment, and the description thereof will be omitted herein.

Figure 17:
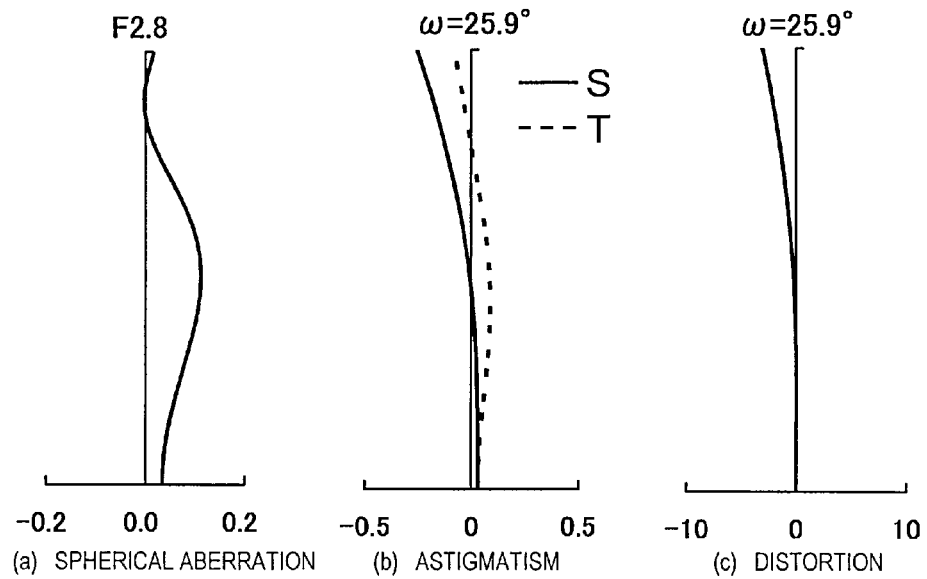
FIGS. 17(a) to 17(c) show how much spherical aberration, astigmatism and distortion were observed in the distance measuring apparatus as the fifth preferred embodiment of the present invention.

The following Table 5 summarizes design data for the optical systems of the distance measuring apparatus shown in FIG. 17. In Table 5, the respective signs have the same meanings as their counterparts of the first preferred embodiment. And FIG. 17 shows the spherical aberration, astigmatism and distortion. It can be seen from FIG. 17 that all of these errors were corrected sufficiently.

TABLE 5

Lens data: focal length f = 5.3 mm, F value = 2.8, designed dominant wavelength λ = 880 nm, angle of view 2 ω = 51.8 degrees, and effective image capturing circle diameter = φ5 mm

| Plane No. | Ri | Di | Nd | vd |
|---|---|---|---|---|
| Object | ∞ | 600 | — | — |
| Stop | ∞ | 0.15 | — | — |
| R1 surface | 6.25 | 4.62 | 1.5253 | 56.0 |
| R2 surface | −3.66124 | 0.1 | — | — |
| Filter 1 surface | ∞ | 0.3 | 1.5168 | 64.2 |
| Filter 2 surface | ∞ | 3.68 | — | — |
| Image plane | ∞ | — | — | — |

Aspheric coefficient

| | k | A4 | A6 | A8 | A10 | A12 |
|---|---|---|---|---|---|---|
| R1 surface | 0 | −0.014853 | 0.019599 | 0.012781 | −0.037370 | 0.017082 |
| R2 surface | 0.36526 | 0.0088004 | −0.0026538 | 0.0011573 | −0.00022549 | 0.000017936 |

If the focal length f, the paraxial radius of curvature R1 of the lens surface opposed to the object, and radius of curvature R2 of the lens surface opposed to the image plane of this preferred embodiment are substituted into Inequality (2), then the resultant value will be −0.60, which falls within the range defined by Inequality (2). Also, the magnitudes of relative pattern location shifts $\Delta x1$-$\Delta o$, $\Delta x2$-$\Delta o$, $\Delta y1$-$\Delta o$, and $\Delta y2$-$\Delta o$ of this preferred embodiment correspond to the data plotted as the curve G5 in the graph shown in FIG. 7.

According to this preferred embodiment, the condition set by Inequality (2) is met, and therefore, the magnitude of relative pattern location shift when some degree of decentration is produced will vary to a lesser degree according to the image capturing position than a situation where the condition set by Inequality (2) is not met. As a result, the amount of parallax detected will also vary to a lesser degree according to the image capturing position. Consequently, the distance to the object can be determined more accurately by Equation (1).

As already described for the first through fifth preferred embodiments of the present invention, the arrangement of lenses that satisfies Inequality (2) can minimize the decline in range finding accuracy, and the arrangement of lenses that satisfies Inequality (3) can further reduce the decline in range finding accuracy.

Embodiment 6

Figure 18:
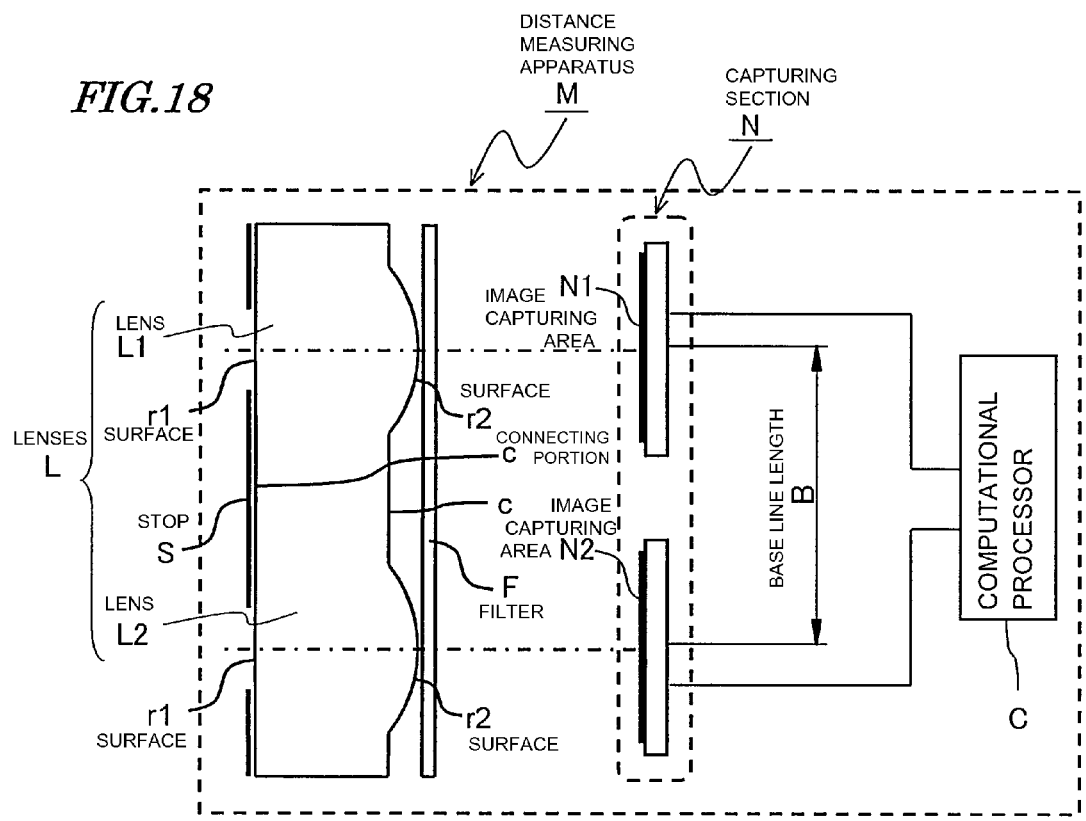
FIG. 18 is a cross-sectional view schematically illustrating a sixth preferred embodiment of a distance measuring apparatus according to the present invention.

FIG. 18 is a cross-sectional view schematically illustrating a sixth preferred embodiment of a distance measuring apparatus according to the present invention. The array of lenses L of this preferred embodiment includes a number of simple lenses L1, L2, of which the surfaces r1 and r2 opposed to the object of range finding and the image capturing area N1, N2, respectively, have the same shapes as their counterparts of the third preferred embodiment described above (that has the lens data and aspheric coefficient shown in Table 3). Also, a stop S that has been formed as an integral member is arranged on the surface of the array of lenses L opposed to the object of range finding, while a filter F for use in common in their respective optical systems is arranged on the other surface of the array of lenses L opposed to the image capturing areas N1, N2. In the other respects, however, this preferred embodiment is quite the same as the first preferred embodiment, and the description thereof will be omitted herein.

Each of the simple lenses L1, L2 has lens surfaces r1 and r2. The respective lens surfaces r1 of the simple lenses L1 and L2 are joined together with a connecting portion c, and the respective lens surfaces r2 of the simple lenses L1 and L2 are also joined together with the connecting portion c.

In a distance measuring apparatus like this preferred embodiment in which the lenses are formed as an integrated array, the respective optical axes of those lenses can be aligned with each other highly precisely and the decline in range finding accuracy can be minimized.

Also, if those lenses are formed as an integrated array, then it would be difficult to reduce the decentration of the lenses. Nevertheless, the lenses themselves have the same shapes as their counterparts of the third preferred embodiment described above, and the conditions set by Inequalities (2) and (3) are met. Therefore, the magnitude of relative pattern location shift when some degree of decentration is produced will vary to a lesser degree according to the image capturing position than a situation where the conditions set by Inequalities (2) and (3) are not met. As a result, the amount of parallax detected will also vary to a lesser degree according to the image capturing position. Consequently, the distance to the object can be determined more accurately by Equation (1).

The first through sixth preferred embodiments of the present invention described above have a binocular structure with two lenses. However, the present invention is also applicable for use to a structure with three, four or more lenses, and virtually the same effect will be achieved in those situations, too.

Hereinafter, arrangement of lenses that do not meet the conditions set by Inequalities (2) and (3) will be described as comparative examples.

Comparative Example 1

Figure 19:
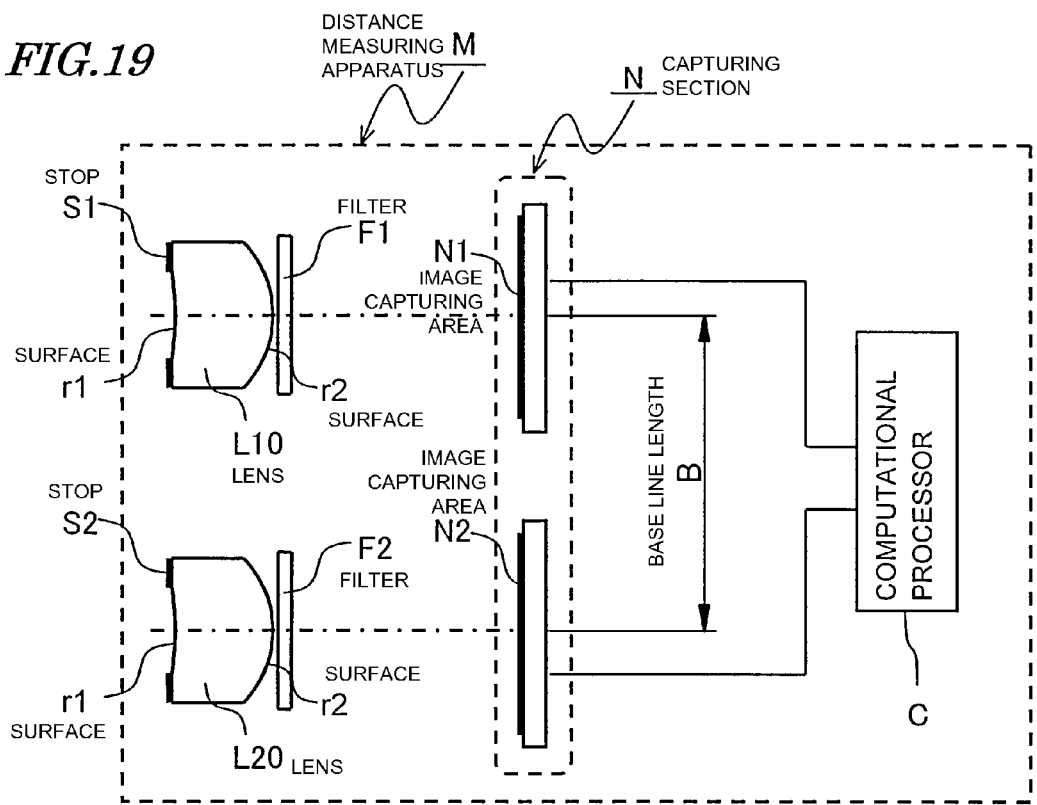
FIG. 19 is a cross-sectional view schematically illustrating a distance measuring apparatus as Comparative Example #1.

FIG. 19 is a cross-sectional view schematically illustrating a distance measuring apparatus as Comparative Example #1. The lenses L10 and L20 of this Comparative Example #1 have a different shape from the lenses L1 and L2 of the first preferred embodiment of the present invention described above. In the other respects, however, this comparative example is quite the same as the first preferred embodiment, and the description thereof will be omitted herein.

Figure 20:
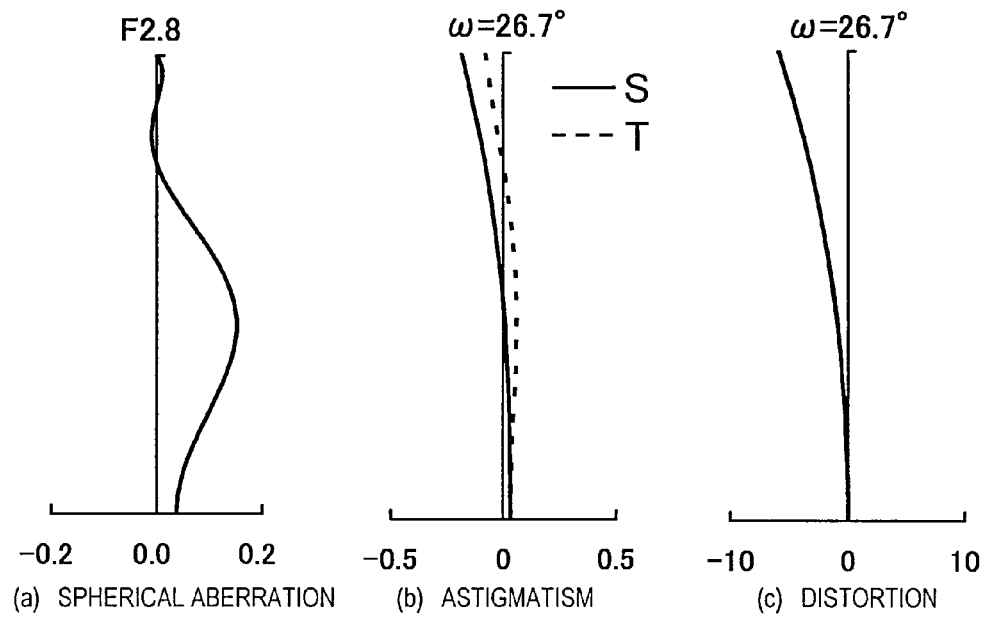
FIGS. 20(a) to 20(c) show how much spherical aberration, astigmatism and distortion were observed in the distance measuring apparatus of Comparative Example #1.

The following Table 6 summarizes design data for the optical systems of the distance measuring apparatus shown in FIG. 19. In Table 6, the respective signs have the same meanings as their counterparts of the first preferred embodiment. And FIG. 20 shows the spherical aberration, astigmatism and distortion. It can be seen from FIG. 20 that all of these errors were corrected sufficiently.

TABLE 6

Lens data: focal length f = 5.3 mm, F value = 2.8, λ = 880 nm, angle of view 2 ω = 53.4 degrees, and effective image capturing circle diameter = φ5 mm

| Plane No. | Ri | di | nd | vd |
|---|---|---|---|---|
| Object | ∞ | 600 | — | — |
| Stop | ∞ | 0.15 | — | — |
| R1 surface | −10 | 2.15 | 1.5253 | 56.0 |
| R2 surface | −2.31074 | 0.1 | — | — |
| Filter 1 surface | ∞ | 0.3 | 1.5168 | 64.2 |
| Filter 2 surface | ∞ | 5.4 | — | — |
| Image plane | ∞ | — | — | — |

Aspheric coefficient

| | k | A4 | A6 | A8 | A10 | A12 |
|---|---|---|---|---|---|---|
| R1 surface | 0 | −0.047099 | 0.078365 | −0.099548 | 0.043524 | −0.0032448 |
| R2 surface | −2.19151 | −0.018031 | −0.0083142 | 0.0068835 | −0.0026480 | 0.00034314 |

If the focal length f, the paraxial radius of curvature R1 of the lens surface opposed to the object, and radius of curvature R2 of the lens surface opposed to the image plane of this comparative example are substituted into Inequality (2), then the resultant value will be −2.82, which does not fall within the ranges defined by Inequalities (2) and (3). Also, the magnitudes of relative pattern location shifts $\Delta x1$-$\Delta o$, $\Delta x2$-$\Delta o$, $\Delta y1$-$\Delta o$, and $\Delta y2$-$\Delta o$ of this comparative example correspond to the data plotted as the curve G0 in the graph shown in FIG. 7.

According to this Comparative Example #1, the respective errors can be certainly corrected sufficiently but the condition set by Inequality (2) is not met. That is why compared to a situation where the condition set by Inequality (2) is met, the magnitude of relative pattern location shift when some degree of decentration is produced will vary much more significantly according to the image capturing position. As a result, the amount of parallax detected will also vary to a far greater degree according to the image capturing position, and therefore, the range finding accuracy will eventually decline significantly.

Comparative Example 2

Figure 21:
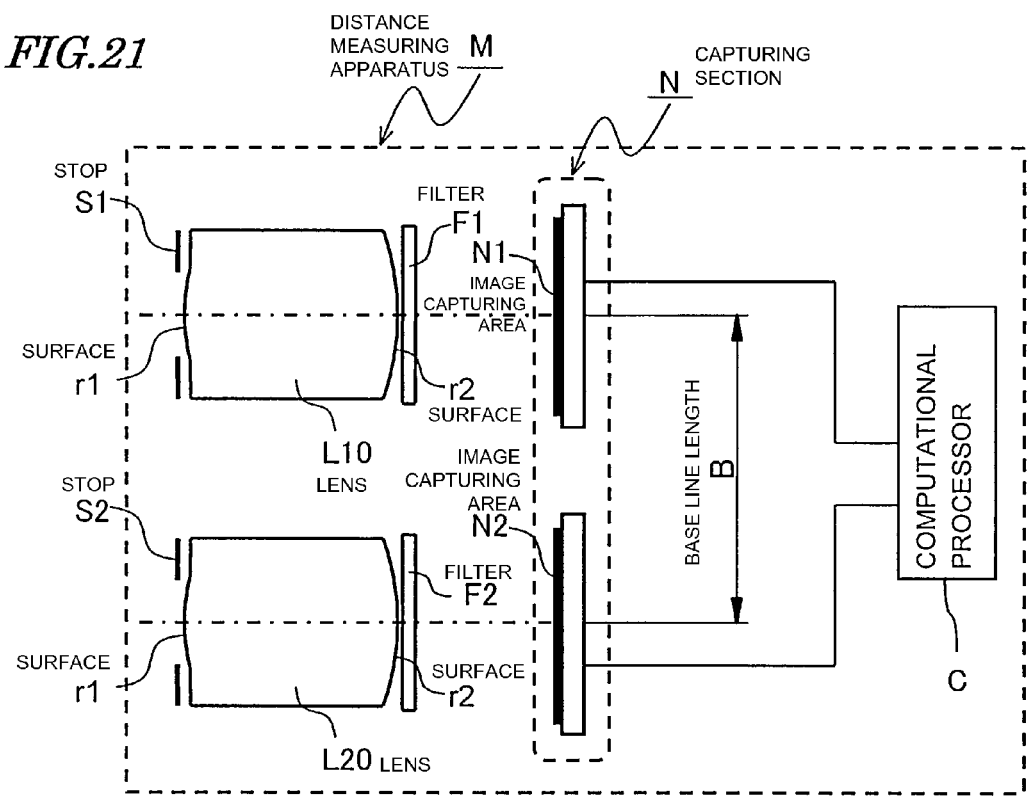
FIG. 21 is a cross-sectional view schematically illustrating a distance measuring apparatus as Comparative Example #2.

FIG. 21 is a cross-sectional view schematically illustrating a distance measuring apparatus as Comparative Example #2. The lenses L10 and L20 of the distance measuring apparatus of this Comparative Example #2 have a different shape from the lenses L1 and L2 of the first preferred embodiment of the present invention described above. In the other respects, however, this comparative example is quite the same as the first preferred embodiment, and the description thereof will be omitted herein.

Figure 22:
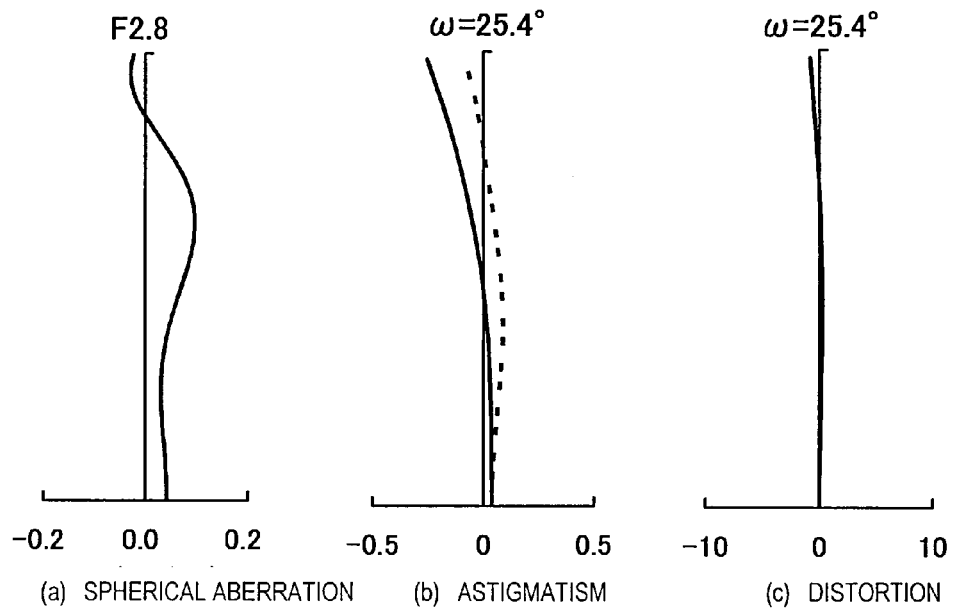
FIGS. 22(a) to 22(c) show how much spherical aberration, astigmatism and distortion were observed in the distance measuring apparatus of Comparative Example #2.
Figure 23:
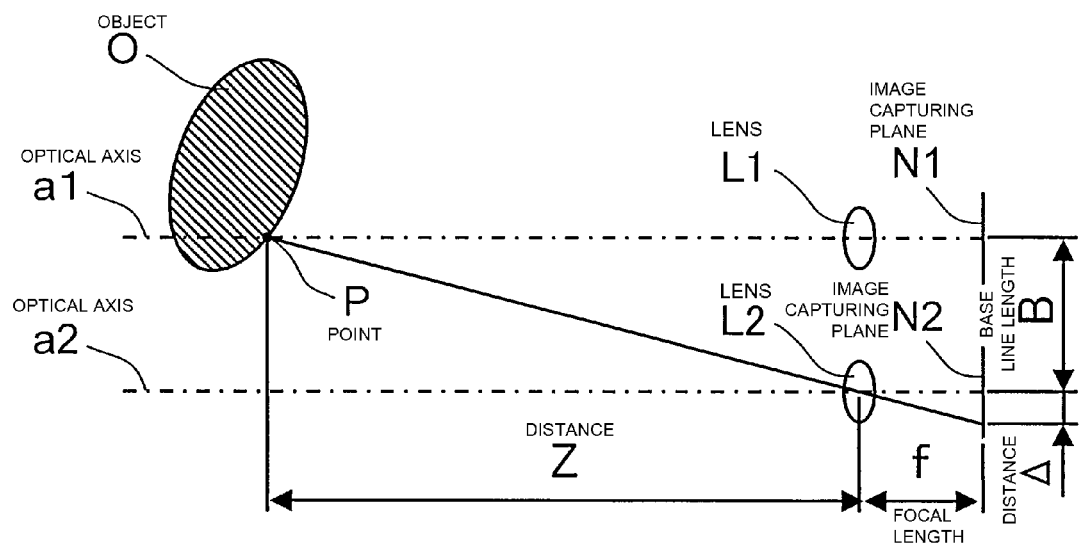
FIG. 23 illustrates how in principle a distance measuring apparatus carries out triangulation.

The following Table 7 summarizes design data for the optical systems of the distance measuring apparatus shown in FIG. 21. In Table 7, the respective signs have the same meanings as their counterparts of the first preferred embodiment. And FIG. 22 shows the spherical aberration, astigmatism and distortion. It can be seen from FIG. 22 that all of these errors were corrected sufficiently.

TABLE 7

Lens data: focal length f = 5.3 mm, F value = 2.8, λ = 880 nm, angle of view 2 ω = 50.8 degrees, and effective image capturing circle diameter = φ5 mm

| Plane No. | Ri | di | nd | νd |
|---|---|---|---|---|
| Object | ∞ | 600 | — | — |
| Stop | ∞ | 0.15 | — | — |
| R1 surface | 4.5 | 4.82 | 1.5253 | 56.0 |
| R2 surface | −4.46080 | 0.1 | — | — |
| Filter 1 surface | ∞ | 0.3 | 1.5168 | 64.2 |
| Filter 2 surface | ∞ | 3.07 | — | — |
| Image plane | ∞ | — | — | — |

Aspheric coefficient

| | K | A4 | A6 | A8 | A10 | A12 |
|---|---|---|---|---|---|---|
| R1 surface | 0 | 0.007005 | −0.065596 | 0.142399 | −0.121010 | 0.036166 |
| R2 surface | 0.06967 | 0.0106590 | −0.0037816 | 0.0018054 | −0.00041340 | 0.000038429 |

If the focal length f, the paraxial radius of curvature R1 of the lens surface opposed to the object, and radius of curvature R2 of the lens surface opposed to the image plane of this comparative example are substituted into Inequality (2), then the resultant value will be −0.01, which does not fall within the ranges defined by Inequalities (2) and (3). Also, the magnitudes of relative pattern location shifts Δx1-Δo, Δx2-Δo, Δy1-Δo, and Δy2-Δo of this comparative example correspond to the data plotted as the curve G6 in the graph shown in FIG. 7.

According to this Comparative Example #2, the respective errors can be certainly corrected sufficiently but the condition set by Inequality (2) is not met. That is why compared to a situation where the condition set by Inequality (2) is met, the magnitude of relative pattern location shift when some degree of decentration is produced will vary much more significantly according to the image capturing position. As a result, the amount of parallax detected will also vary to a far greater degree according to the image capturing position, and therefore, the range finding accuracy will eventually decline significantly.

Comparing the drawings illustrating the first through sixth preferred embodiments of the present invention described above (FIGS. 8, 10, 12, 14, 16 and 18) to the ones illustrating Comparative Examples #1 and #2 (FIGS. 19 and 21), it can be seen that the lens surface r1 opposed to the object has a more planar shape in the first through sixth preferred embodiments than in Comparative Examples #1 and #2. These results reveal that if the condition set by Inequality (2) is met, then the lens surface closer to the object becomes more planar.

INDUSTRIAL APPLICABILITY

A distance measuring apparatus according to the present invention can be used effectively in various applications including cars, surveillance cameras, stereoscopic shape measuring systems and so on.

REFERENCE SIGNS LIST

| M | distance measuring apparatus |
|---|---|
| S1, S2 | stop |
| L1, L2 | simple lens |
| F1, F2 | filter |
| N1, N2 | image capturing area |
| B | base line length |
| r1, r2, e, c | surface |

The invention claimed is:

1. A distance measuring apparatus for determining the distance to an object of range finding based on the amount of parallax between multiple images, the distance measuring apparatus comprising:

a number of simple lenses in substantially the same shape, on which light that has come from the object of range finding is incident; and an image capturing section, which has a number of image capturing areas, each facing an associated one of the simple lenses, and which captures images of the object of range finding that have been produced by the respective simple lenses on their associated image capturing areas, wherein lens surfaces of each said lens that are opposed to the object of range finding and the image capturing section, respectively, are only aspheric refracting surfaces, wherein in each of the simple lenses, the lens surface that is opposed to the image capture section is convex toward the image capture section, and wherein in each of the simple lenses, the paraxial radii of curvature R1 and R2 of the lens surfaces that are opposed to the object of range finding and the image capturing section, respectively, and its focus length f satisfy a condition $-2.0 \leq f(1/R1+1/R2) \leq -0.85$.

2. The distance measuring apparatus of claim 1, wherein the simple lenses are formed as an integrated array of lenses.

3. The distance measuring apparatus of claim 1, wherein the simple lenses are formed as an integrated array of lenses.

* * * * *